US011445234B2

(12) United States Patent
Zimmerman et al.

(10) Patent No.: US 11,445,234 B2
(45) Date of Patent: Sep. 13, 2022

(54) PLATFORM AND PROCESS FOR ENABLING AND MANAGING MOBILE SMART TELEVISION, BROADCAST, RECEPTION, AND/OR USAGE

(71) Applicant: TracFone Wireless, Inc., Miami, FL (US)

(72) Inventors: James Zimmerman, Miami, FL (US); Ricardo Ramon, Miami, FL (US); Miguel Fernandez, Miami, FL (US); Barry Buchowski, Miami, FL (US)

(73) Assignee: TRACFONE WIRELESS, INC., Miami, FL (US)

( * ) Notice: Subject to any disclaimer, the term of this patent is extended or adjusted under 35 U.S.C. 154(b) by 0 days.

(21) Appl. No.: 16/816,688

(22) Filed: Mar. 12, 2020

(65) Prior Publication Data

US 2020/0296444 A1    Sep. 17, 2020

Related U.S. Application Data

(60) Provisional application No. 62/817,130, filed on Mar. 12, 2019.

(51) Int. Cl.
| | |
|---|---|
| *H04N 21/414* | (2011.01) |
| *H04N 21/262* | (2011.01) |
| *H04N 21/433* | (2011.01) |
| *H04N 21/61* | (2011.01) |
| *H04N 21/482* | (2011.01) |

(52) U.S. Cl.
CPC . *H04N 21/41407* (2013.01); *H04N 21/26283* (2013.01); *H04N 21/4334* (2013.01); *H04N 21/6181* (2013.01)

(58) Field of Classification Search
CPC ............ H04N 21/6181; H04N 21/41407
See application file for complete search history.

(56) References Cited

U.S. PATENT DOCUMENTS

| | | | |
|---|---|---|---|
| 2002/0174430 A1* | 11/2002 | Ellis ................. | H04N 21/23406 725/46 |
| 2007/0110056 A1* | 5/2007 | Hwang ................ | H04N 21/633 370/389 |
| 2019/0182537 A1* | 6/2019 | Deshpande ............ | H04H 60/72 |
| 2019/0268777 A1* | 8/2019 | Simon ................... | H04W 28/24 |
| 2019/0364425 A1* | 11/2019 | Schlack ................ | H04L 9/3247 |
| 2021/0051443 A1* | 2/2021 | Conus ................... | H04W 16/14 |

* cited by examiner

*Primary Examiner* — Hsiungfei Peng

(57) ABSTRACT

A broadcast television support platform includes at least one processor implementing the broadcast television support platform, the broadcast television support platform being configured to provide support to a wireless device implementing a television receiver configured for receiving and displaying terrestrial television content. The broadcast television support platform also includes an input/output device, the input/output device configured to connect the broadcast television support platform over a wireless network to the wireless device implementing the television receiver to support reception and display of the terrestrial television content.

18 Claims, 9 Drawing Sheets

PLATFORM AND PROCESS FOR ENABLING AND MANAGING MOBILE SMART TELEVISION, BROADCAST, RECEPTION, AND/OR USAGE

CROSS-REFERENCE TO RELATED APPLICATIONS

This application claims the benefit from U.S. Provisional Application No. 62/817,130 filed on Mar. 12, 2019, which is hereby incorporated by reference in its entirety for all purposes as if fully set forth herein.

BACKGROUND OF THE DISCLOSURE

1. Field of the Disclosure

The disclosure relates to a platform for enabling and managing mobile smart television. The disclosure further relates to a process for enabling and managing mobile smart television. The disclosure further relates to a mobile smart television.

The disclosure further relates to a platform for enabling and managing mobile smart television broadcast. The disclosure further relates to a process for enabling and managing mobile smart television broadcast.

The disclosure further relates to a platform for enabling and managing mobile smart television reception. The disclosure further relates to a process for enabling and managing mobile smart television reception.

The disclosure further relates to a platform for enabling and managing mobile smart television usage. The disclosure further relates to a process for enabling and managing mobile smart television usage.

2. Related Art

Television broadcasters are being excluded from the growing mobile phone marketplace. In this regard, Traditional Television is migrating to Internet protocol (IP) based content (Digital Media i.e. Netflix, Hulu, Amazon Prime, Disney+, Personal Media and Cloud Storage, and/or the like). Customers are converging or dropping Cable and Satellite programming packages for smaller on-line subscriptions.

Currently, Local Television Broadcasters do not have a mobile delivery channel. In this regard, there is no reliable way to broadcast IP data streams without latency. Moreover, mobile chipset performance limits high resolution viewing.

Accordingly, a need exists to provide a wireless user with a wireless device and/or service that provides high resolution television viewing from over the air sources such as content from Local Television Broadcasters.

SUMMARY OF THE DISCLOSURE

The foregoing needs are met, to a great extent, by the disclosure, providing a platform for enabling and managing mobile smart television and a process for enabling and managing mobile smart television.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a broadcast television support platform including: at least one processor implementing the broadcast television support platform, the broadcast television support platform being configured to provide support to a wireless device implementing a television receiver configured for receiving and displaying terrestrial television content. The broadcast television support platform also includes an input/output device, the input/output device configured to connect the broadcast television support platform over a wireless network to the wireless device implementing the television receiver to support reception and display of the terrestrial television content. The broadcast television support platform also includes the broadcast television support platform being configured to enforce polices based upon subscription rules and subscriber status on the wireless device implementing the television receiver to support reception and display of the terrestrial television content. Other embodiments of this aspect include corresponding computer systems, apparatus, and computer programs recorded on one or more computer storage devices, each configured to perform the actions of the methods.

One general aspect includes a broadcast television support process including: implementing at least one processor in a broadcast television support platform to provide support to a wireless device implementing a television receiver configured for receiving and displaying terrestrial television content. The broadcast television support process also includes connecting with an input/output device of the broadcast television support platform over a wireless network to the wireless device implementing the television receiver to support reception and display of the terrestrial television content. The broadcast television support process also includes enforcing with the broadcast television support platform polices, based upon subscription rules and subscriber status, on the wireless device implementing the television receiver to support reception and display of the terrestrial television content. Other embodiments of this aspect include corresponding computer systems, apparatus, and computer programs recorded on one or more computer storage devices, each configured to perform the actions of the methods.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

Figure 1:
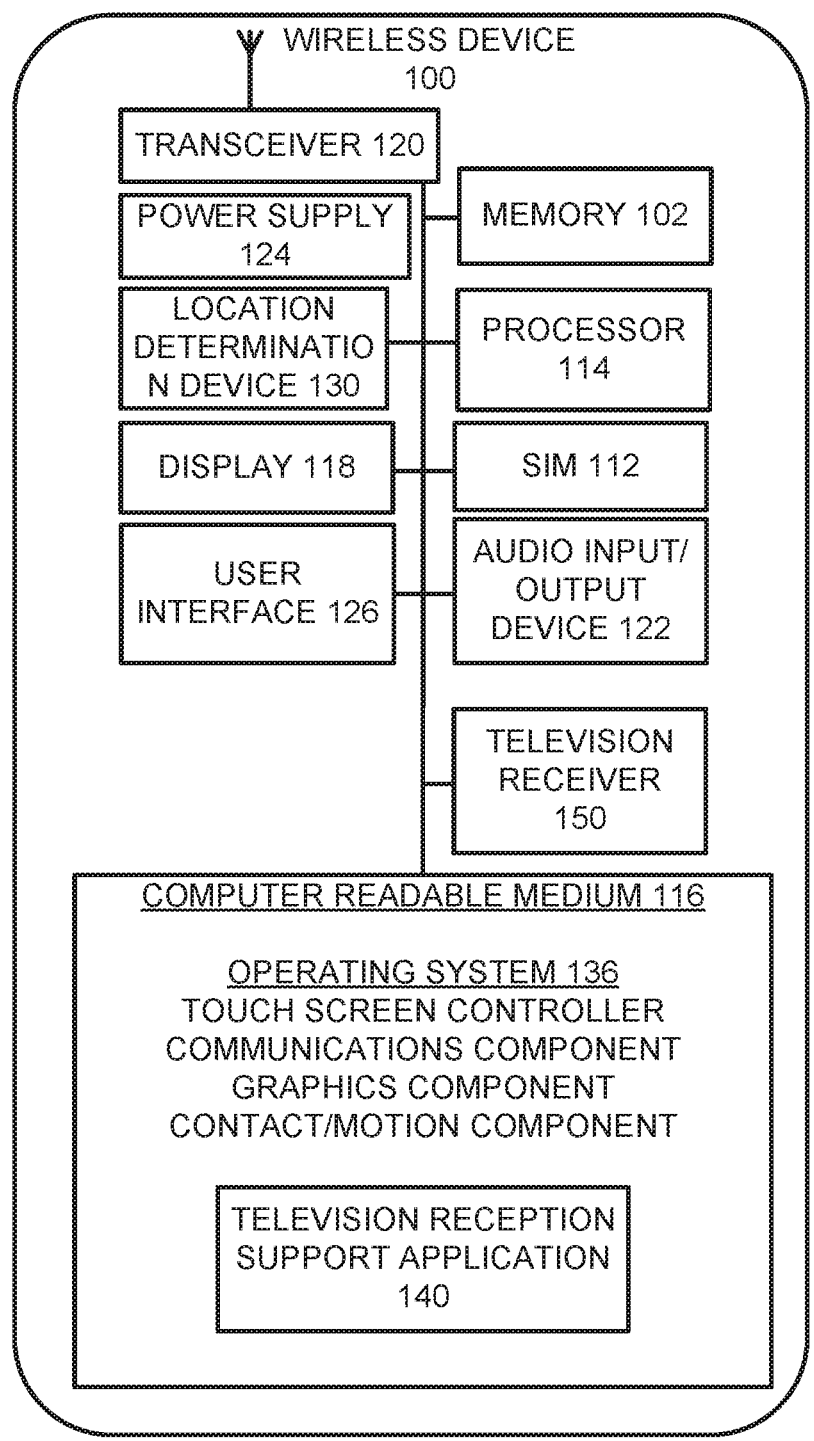
FIG. 1 illustrates an exemplary wireless device having a television receiver, in accordance with aspects of the disclosure.

The disclosure is directed to utilizing new opportunities based upon advances in Television Broadcast technology that may use Internet Protocols, Mobile Phone chipset technologies, and/or the like. The disclosure relates to implementing a Mobile Smart Television integrated into a Smartphone utilizing a television receiver such as an Advanced Television Systems Committee 3.0 (ATSC 3.0) compliant receiver, a Software-Defined Radio (SDR) receiver chip, or equivalent components, a native subscription management software application that may be implemented without the need for a Cellular, Internet, or Broadband connection, along with a remote policy management system, such as server, that may enable:

Free Local high definition Television Broadcasts and Programming.

Paid Local high definition Television Broadcasts and Programming.

Sponsored high definition Television Broadcasts and Programming.

Subscription Based high definition Television Programming (for example, pay Per View, Netflix, Hulu, Disney+, Personal Media and Cloud Storage, and others).

Closed Circuit Television (CCT) Broadcasts for Enterprise, Proprietary and Security Broadcasts, and/or the like.

Additionally, the disclosure may provide a device that may include features of a Smartphone in addition to the features of a Smart Television and High Definition (HD) Television set. Additionally, the disclosure provides a platform that may support HD Television Broadcast enablement, access to programming and subscription management, and/or the like.

The disclosure may include a software application that may enforce platform server polices in real time based upon subscription rules and subscriber status. In certain aspects, the software application may manage operation of the integrated chip operation, channel access and display, and/or the like.

In this disclosure and claims it is to be understood that reference to a wireless device is intended to encompass electronic devices such as mobile phones, tablet computers, gaming systems, MP3 players, personal computers, PDAs, and/or the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, Internet of things (IoT) based wireless devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone services through the use of a wireless device, such as a Global System for Mobile Communication (GSM) network, a Code-Division Multiple Access (CDMA) network, a Long-Term Evolution (LTE) network, a 4G (fourth generation of cellular communications) network, a 5G (fifth generation wireless technology for digital cellular networks) network, a wireless fidelity (Wi-Fi) network, a network implementing a communication channel as defined herein, and/or the like that may utilize the teachings of the disclosure.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not for other aspects.

FIG. 1 illustrates an exemplary wireless device having a television receiver, in accordance with aspects of the disclosure.

In particular, FIG. 1 illustrates an exemplary wireless device 100. The wireless device 100 may include one or more of a transceiver 120, a display 118, a computer readable medium 116, a processor 114, a television reception support application 140, a power supply 124, a location determination device 130, a graphical user interface 126, a memory 102, a subscriber identity module or SIM 112, an audio input/output device 122, and/or the like. However, the wireless device 100 may be implemented with a greater number of components or a fewer number of components depending on the desired implementation and the desired features for the wireless device.

FIG. 1 further illustrates that the wireless device may include a television receiver 150. In one aspect, the television receiver 150 may implement ATSC 3.0 (Advanced Television Systems Committee 3.0) standards. In one aspect, the television receiver 150 may be configured to support technologies, including High Efficiency Video Coding (HEVC) for video channels of up to 2160p 4K resolution (horizontal display resolution of approximately 4,000 pixels) at 120 frames per second, wide color gamut, high dynamic range, Dolby AC-4 and MPEG-H 3D (Moving Picture Experts Group) Audio, datacasting capabilities, and/or robust mobile television support. In further aspects, the television receiver 150 may utilize different technologies including different video coding with a different resolution. In further aspects, the television receiver 150 may utilize different video coding with a higher resolution.

In one aspect, the television receiver 150 may implement a Software-Defined Radio (SDR) chip. In one aspect, the SDR chip implementation of the television receiver 150 may provide a re-usable and "future-proof" radio platform by combining an RF-to-baseband transceiver PHY (radio frequency—RF; and physical layer—PHY), a digital processor, and/or the like. In one aspect, the SDR chip implementation of the television receiver 150 may include software-configurability and control, improved system performance, reduction in system size, and/or the like.

In one aspect, the television receiver 150 may implement an SDR chip that may include a plurality separate inputs that may be provided each with a dedicated low noise amplifier. In one aspect, the television receiver 150 may precondition the radio frequency signal for each port and may be amplified by a programmable low-noise amplifier. In one aspect, the television receiver 150 may operate with the radio frequency signal to mix the radio frequency with a phase locked loop output to directly down convert to a baseband. In one aspect, the television receiver 150 may implement an intermediate frequency amplifier, a programmable bandwidth low-pass channel select filter, a programmable gain amplifier, at least one analog-to-digital converter, a baseband processor, and/or the like.

In one aspect, the television receiver 150 may implement a demodulator package, a demodulator with analog/digital conversion capability, and/or a demodulator with analog/digital conversion plus an embedded turner. In one aspect, the television receiver 150 may utilize a closely coupled antenna array to ensure reception in a high-speed mobile environment. In one aspect, the television receiver 150 may implement mobile smart television capabilities that may provide access to paid and or premium content delivered via television broadcast to the wireless device 100.

In one aspect, the television receiver 150 may implement other digital television broadcast (DVB) standards including DVB standards, DVB-T, DVB-T2, DVB-S, DVB-S2, DVB-S2X, DVB-C, DVB-C2, DVB-H, DVB-NGH, DVB-T2-Lite, DVB-SH, ATSC 2.0, ATSC-M/H, ISDB (Integrated Services Digital Broadcasting), ISDB-T, ISDB-T, SBTVD, ISDB-S, ISDB-C, 1seg, DTMB, DTMB, DTMB-A, CMMB, DMB standard, T-DMB, S-DMB, and/or the like. In one aspect, the television receiver 150 may utilize various Codecs (coder-decoder) including H.265/MPEG-H HEVC, H.264/MPEG-4 AVC, H.262/MPEG-2 Part 2, VC-1, AVS, MPEG-H, HE-AAC, AAC, AC-4, E-AC-3, AC-3, MP3, MP2, the like. In one aspect, the television receiver 150 may be implemented to receive various frequency bands including VHF (Very High Frequency), UHF (Ultra High Frequency), SHF (Super High Frequency), and/or the like.

The processor 114 of the wireless device 100 may be configured to execute the television reception support application 140. In one aspect, the television reception support application 140 may be an over the air television reception application. The processor 114 can be, for example, dedicated hardware as defined herein, a computing device as defined herein, a processor, a wireless device processor, a microprocessor, a wireless device chipset, a central processing unit (CPU), a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute the television reception support application 140.

The television reception support application 140 may be written in any programming language, such as, for example, C, Java, Objective-C, C+, Python, Visual Basic, Perl, and/or any other programming language the processor 114 is capable of executing. The television reception support application 140 may be downloaded by the wireless device 100, may be stored on a chipset, the SIM 112 of the wireless device 100, stored in the memory 102, stored in the computer readable medium 116, may be part of the system bias of the wireless device 100, and/or the like.

Subscription Management

In one aspect, the television reception support application 140 may be configured with the wireless device 100 and/or the television receiver 150 to implement the television reception support application 140 to provide and/or the television reception support application 140 may be configured to be responsive to a broadcast television support platform 260 to provide subscription management features. In one aspect, the television services as described by this disclosure may include subscription to various information, features, data, and/or the like provided by the television reception support application 140 and/or the broadcast television support platform 260. In one aspect, the television reception support application 140 may be configured to add, modify, or the like subscription to the various information, features, data, and/or the like provided by the television reception support application 140 and/or the broadcast television support platform 260. In one aspect, the television reception support application 140 may be configured to generate a graphical user interface to display controls to view, utilize, implement, add, delete, modify, and/or the like subscription to the various information, features, data, and/or the like provided by the television reception support application 140 and/or the broadcast television support platform 260. In one aspect, the subscription management software application may be implemented as a native application. In one aspect, the subscription management may include management of digital video recorder (DVR) functionality, programming information, television guide information, channel access and display information, polices, subscription rules, and subscriber status, and/or the like. In one aspect, the subscription management may be management of any services and information described herein.

Programming Information

In one aspect, the television reception support application 140 may be configured with the wireless device 100 and/or the television receiver 150 to implement the television reception support application 140 to provide and/or the television reception support application 140 may be configured to be responsive to a broadcast television support platform 260 to provide access to programming information. In one aspect, the programming information may be provided by the television reception support application 140 and/or the broadcast television support platform 260. In one aspect, the television reception support application 140 may be configured to generate a graphical user interface to view, utilize, implement, add, delete, modify, and/or the like programming information provided by the television reception support application 140 and/or the broadcast television support platform 260. In one aspect, the television reception support application 140 may be configured to generate a graphical user interface to display controls to view, utilize, implement, add, delete, modify, and/or the like the programming information provided by the television reception support application 140 and/or the broadcast television support platform 260.

In one aspect, the programming information may include Electronic program guides (EPGs) and/or interactive program guides (IPGs) that may be menu-based systems that provide users of the television reception support application 140 with continuously updated menus displaying broadcast programming (TV listings) or scheduling information for current and upcoming programming. In some aspects, the television reception support application 140 may include guides that may also feature backward scrolling to promote catch up content.

In one aspect, the programming information may include non-interactive electronic program guides and may include a digitally displayed, non-interactive menu of program scheduling information shown by a television provider to its viewers. In one aspect, the programming information may allow users to navigate scheduling information menus interactively, selecting and discovering programming by time, title, channel or genre using an input of the wireless device 100. In one aspect, the programming information may include data used to populate an interactive EPG that may be distributed over the Internet from the broadcast television support platform 260, either for a charge or free of charge, and implemented on the wireless device 100 utilizing the television reception support application 140.

Polices, Subscription Rules, and Subscriber Status

In one aspect, the television reception support application 140 may be configured with the wireless device 100 and/or the television receiver 150 to implement the television reception support application 140 to provide and/or the television reception support application 140 may be configured to be responsive to a broadcast television support platform 260 to enforce the broadcast television support platform 260 polices in real time based upon subscription rules and subscriber status. In one aspect, the policies may be enforced by the television reception support application 140 that are provided by the broadcast television support platform 260. In one aspect, the broadcast television support platform 260 may be configured to generate a graphical user interface to view, utilize, implement, add, delete, modify, and/or the like policies based upon subscription rules and subscriber status. In some aspects, the subscription may be a paid service. In some aspects, the subscription may provide any services and information described herein.

Channel Access and Display

In one aspect, the television reception support application 140 may be configured with the wireless device 100 and/or the television receiver 150 to implement the television reception support application 140 to provide and/or the television reception support application 140 may be configured to be responsive to a broadcast television support platform 260 to manage the television receiver 150, channel access and display, and/or the like. In one aspect, the television reception support application 140 may be configured to generate a graphical user interface to view, utilize, implement, add, delete, modify, and/or the like channel access provided by the television reception support application 140 and/or the broadcast television support platform 260. In one aspect, the television reception support application 140 may be configured to generate a graphical user interface to display television programming provided by the television reception support application 140 and/or the broadcast television support platform 260. In one aspect, the television reception support application 140 may be configured to generate a graphical user interface to display television programming provided by the television reception support application 140 and/or the broadcast television support platform 260 based on a location of the wireless device 100.

In one aspect, the television reception support application 140 may be configured with the wireless device 100 and/or the television receiver 150 to implement the television reception support application 140 to provide and/or the television reception support application 140 may be configured to be responsive to a broadcast television support platform 260 to provide television scheduling. In one aspect, the television scheduling may be provided to the wireless device 100 and/or the television reception support application 140 via phone data capacity. In one aspect, the television scheduling may include channels, television shows, sporting events, times, length of shows, cast, production crew and personnel biographies, plot summaries, trivia, fan reviews and ratings, and/or the like.

In one aspect, the television reception support application 140 may be configured with the wireless device 100 and/or the television receiver 150 to implement the television reception support application 140 to provide and/or the television reception support application 140 may be configured to be responsive to a broadcast television support platform 260 to provide television scheduling via information through text. In this regard, the wireless device 100 may be configured to generate, send, receive, and/or the like text messages that may include television scheduling information. In one aspect, the television reception support application 140 may be configured to share television scheduling information with other wireless devices. In one aspect, the application may be configured to receive television scheduling information via text from other wireless devices. In this aspect, the text message may include links to initiate operation of the television reception support application 140 and/or the television receiver 150. In one aspect, the text message may reference a television show, initiate operation of the television reception support application 140, and/or the television receiver 150, and the television reception support application 140 and/or the television receiver 150 may find the television show in a programming listing and initiate reception and/or recording of the television show. In one aspect, the television reception support application 140 may be configured to share television scheduling information utilizing social media. In one aspect, the television reception support application 140 may be configured to share television scheduling information utilizing a social media platform. In one aspect, the television reception support application 140 may be configured to share television scheduling information utilizing a social media application.

Television Guide Information

In one aspect, the television reception support application 140 may be configured with the wireless device 100 and/or the television receiver 150 to implement the television reception support application 140 to provide and/or the television reception support application 140 may be configured to be responsive to a broadcast television support platform 260 to provide television guide information. In one aspect, the television guide information may be provided by paid subscription. The television guide information may include channels, television shows, sporting events, times, length of shows, cast, production crew and personnel biographies, plot summaries, trivia, fan reviews and ratings, and/or the like. In one aspect, the television reception support application 140 may include a graphical user interface to search the television guide to find television content. In one aspect, the television reception support application 140 may include a graphical user interface to search the television guide to find television content along with the ability to designate particular television content as a favorite for future viewing, quick access, generation of reminders, generation of calendar events, and/or the like.

Digital Video Recorder (DVR) Functionality

In one aspect, the television reception support application 140 may be configured with the wireless device 100 and/or the television receiver 150 to implement the television reception support application 140 to provide and/or the television reception support application 140 may be configured to be responsive to a broadcast television support platform 260 to provide digital video recorder (DVR) functionality. In one aspect, the television reception support application 140 may provide an on-screen guide of scheduled broadcast programming television programs. In one aspect, the television reception support application 140 may be configured to receive instructions from a user to record every episode of a series through a graphical user interface of the wireless device 100. In one aspect, the television reception support application 140 may support searches, which allow the user to find and record shows that match their interests by title, actor, director, category, keyword and/or the like through a graphical user interface of the wireless device 100. In one aspect, digital video recorder (DVR) functionality may be implemented by the television reception support application 140 and may operate the television receiver 150 to receive particular television programming and store the particular television programming in the memory 102 in a digital format.

In one aspect, digital video recorder (DVR) functionality may include the ability to select and play back the particular television programming stored in the memory 102 through a graphical user interface of the wireless device 100. In one aspect, digital video recorder (DVR) functionality may include the ability to delete the particular television programming stored in the memory 102 through a graphical user interface of the wireless device 100. In one aspect, digital video recorder (DVR) functionality may include the ability to automatically store television programming stored in the memory 102 based on a user's prior recording history, interests, and/or the like. In one aspect, the digital video recorder (DVR) functionality may include the ability to automatically record and store television programming in the memory 102 based on artificial intelligence utilizing a user's prior recording history, interests, and/or the like.

In one aspect, digital video recorder (DVR) functionality may include the ability to skip commercials based on information in the received television signals. In one aspect, this functionality may be provided through a paid service implemented by the broadcast television support platform 260. In one aspect, the digital video recorder (DVR) functionality may include the ability to prevent the recording of commercials based on information in the received television signals. In one aspect, this functionality may be provided through a paid service implemented by the broadcast television support platform 260. In one aspect, digital video recorder (DVR) functionality may include the ability to record, pause, fast-forward, rewind, and/or the like the received television signals through a graphical user interface of the wireless device 100.

In one aspect, the television reception support application 140 may be configured with the wireless device 100 and/or the television receiver 150 to implement the television reception support application 140 to provide and/or the television reception support application 140 may be configured to be responsive to a broadcast television support platform 260 to provide the digital video recorder (DVR) functionality utilizing voice recognition. In one aspect, digital video recorder (DVR) functionality may include the ability to record particular television programming stored in the memory 102 based on instructions obtained through voice recognition. In one aspect, digital video recorder (DVR) functionality may include the ability to select and play back particular television programming stored in the memory 102 based on instructions obtained through voice recognition. In one aspect, this functionality may be provided through a paid service implemented by the broadcast television support platform 260. In one aspect, the DVR functionality may interact with Television-based IPGs in conjunction with Program Delivery Control (PDC) technology that may also facilitate a selection of programs for recording with the digital video recorder (DVR) functionality based on instructions obtained through voice recognition.

In one aspect, the television reception support application 140 may be configured with the wireless device 100 and/or the television receiver 150 to implement the television reception support application 140 to provide and/or the television reception support application 140 may be configured to be responsive to a broadcast television support platform 260 to provide the digital video recorder (DVR) functionality to other devices. In this aspect, the digital video recorder (DVR) may include the ability to select and play back particular television programming stored in the memory 102 and transmit the television programming from the wireless device 100 via a wireless fidelity, other communication channel as defined herein, a HDMI (High-Definition Multimedia Interface) connector, or the like. In one aspect, the wireless device 100 implementing the television reception support application 140 may operate as a digital media player. In this aspect, the wireless device 100 implementing the television reception support application 140 may enable users to play the television programming on a high-definition television, a home audio system, and/or the like. In this aspect, the wireless device 100 implementing the television reception support application 140 may enable users to play the television programming on a high-definition television or home audio system by casting or telecasting wireless signals to a smart television.

In one aspect, the television reception support application 140 may be configured with the wireless device 100 and/or the television receiver 150 to implement the television reception support application 140 to provide and/or the television reception support application 140 may be configured to be responsive to a broadcast television support platform 260 to provide Subscription Based high definition Television Programming (for example, pay Per View, Netflix, Hulu, Disney+, Personal Media and Cloud Storage, and others) to a wireless device 100. In this regard, the wireless device 100 may operate as a digital media player configured to play video content from various content providers. In one aspect, the wireless device 100, the television receiver 150, or the like may include a HDMI (High-Definition Multimedia Interface) connector.

The transceiver 120 can include, for example, a wireless antenna and associated circuitry capable of data transmission with a mobile data network utilizing at least one data transmission protocol utilizing one or ore communication channels as defined herein. The transceiver 120 may transmit and receive data utilizing the data transmission protocol. Moreover, the transceiver 120 may provide voice, data, and text message capabilities. In one aspect, the processor 114 and/or the transceiver 120 may be implemented as a wireless device chipset. In one aspect, the processor 114, the television receiver 150, and/or the transceiver 120 may be implemented as a wireless device chipset. Moreover, with reference to FIG. 4, the transceiver 120 may provide data service to the wireless device 100 from the wireless network 200 and/or Internet service from a wireless fidelity access point 300. In particular aspects, the transceiver 120 and/or the television receiver 150 may be configured for viewing of different content from broadcast signals using Internet protocol (IP) that has been sliced and delivered using separate Internet protocol (IP) Ranges and Ports, which may take advantage of the television reception support application 140 and/or the broadcast television support platform 260.

The display 118 of the wireless device 100 may be configured to display various information provided to the display 118 from the processor 114 of the wireless device 100, the computer readable medium 116, the television reception support application 140, and/or the like. The display 118 may include a screen. The screen may be a light-emitting diode display (LED), an electroluminescent display (ELD), a plasma display panel (PDP), a liquid crystal display (LCD), an organic light-emitting diode display (BLED), an active-matrix organic light-emitting diode (AMBLED) display, an IPS (In-plane switching) liquid crystal display (LCD), or any other display technology. In one aspect, the display 118 may be configured to display television in response to the television receiver 150.

In one aspect, the displayed information may include video responsive to a television signal for displaying a television show and/or television content. In one aspect, the displayed information may include a graphical user interface related to the television reception support application 140 for providing DVR functionality, programming information, television guide information, channel access and display information, polices, subscription rules, and subscriber status, and/or the like.

In one aspect, the displayed information may include displaying icons, the network connection strength, the television signal strength, the type of mobile network data connection (such as 3G, 4G LTE, EVDO, Wi-Fi, etc.) the wireless device 100 is connected to, and/or other information potentially useful to the user. The information may be displayed simultaneously or the user may interact with an input device such as buttons on the wireless device 100 or, if the display 118 is a touch screen, with the icons on the display 118 to cycle through the various types of information for display.

The wireless device 100 may also have a power supply 124. The power supply 124 may be a battery such as nickel cadmium, nickel metal hydride, lead acid, lithium ion, lithium ion polymer, and/or the like. The wireless device 100 may also include a memory 102, which could be an internal memory and/or a removable storage type such as a memory chip. The memory 102 may store information about the wireless device 100, including wireless profiles and settings. Additionally, the wireless device 100 may include an audio input/output device 122 for the input or output of sounds in videos, music, television, and/or the like.

In some aspects, the wireless device 100 may provide voice services, data services, and messaging services. The wireless device 100 may also have a graphical user interface 126 to facilitate use of the wireless device 100 with an operating system 136, the television reception support application 140, and/or the like. The operating system 136 may be associated with a touchscreen controller, one or more communications components, one or more graphics components, one or more contact/motion components, and/or the like.

In some aspects, the wireless device 100 and/or a wireless network 200 may estimate the location of the wireless device 100 based, at least in part, on a global navigation satellite system (GNSS) with a location determination device 130. In another aspect, a wireless network 200 may secure location determination based on a specific cell in which the wireless device 100 connects. In yet another aspect, a wireless network 200 may obtain location determination based on triangulation with respect to a plurality of cells in which the wireless device 100 receives signals. In one aspect, the location of the wireless device 100 may be provided to the television reception support application 140 and/or the broadcast television support platform 260 in order to provide location specific information regarding DVR functionality, programming information, television guide information, channel access and display information, polices, subscription rules, and subscriber status, and/or the like.

The wireless device 100 may use a subscriber identity module (SIM) card 112. In other aspects, the wireless device 100 may be implemented without a SIM 112. The SIM 112 may vary in size and may be a micro, mini, nano size, or any size SIM 112. The SIM 112 may be associated with a client, which may manage SIMs 112 to control which wireless networks the wireless device 100 may connect. The SIM 112 may store network-specific information used to authenticate and identify subscribers on the network including one or more of an integrated circuit card identifier (ICCID), International Mobile Subscriber Identity (IMSI), Authentication Key (Ki), Local Area Identity (LAI), Operator-Specific Emergency Number, and/or the like. The SIM 112 may also store other carrier-specific data such as the SMSC (Short Message Service Center) number, Service Provider Name (SPN), Service Dialing Numbers (SDN), Advice-Of-Charge parameters, Value Added Service (VAS) applications, and/or the like. The SIM 112 may be identified by its ICCID. ICCIDs may be stored in the SIM cards. The ICCID is defined by the ITU-T recommendation E.118 as the Primary Account Number. The SIM 112 layout may be based on ISO/IEC 7812. In some aspects, the SIM 112 may also be a soft SIM, electronic SIM, or embedded SIM. In some aspects, other memory locations of the wireless device 100 may store carrier-specific data such as the International Mobile Subscriber Identity (IMSI), Authentication Key (Ki), Local Area Identity (LAI), Operator-Specific Emergency Number, the SMSC (Short Message Service Center) number, Service Provider Name (SPN), Service Dialing Numbers (SDN), Advice-Of-Charge parameters, Value Added Service (VAS) applications, and/or the like.

Figure 2:
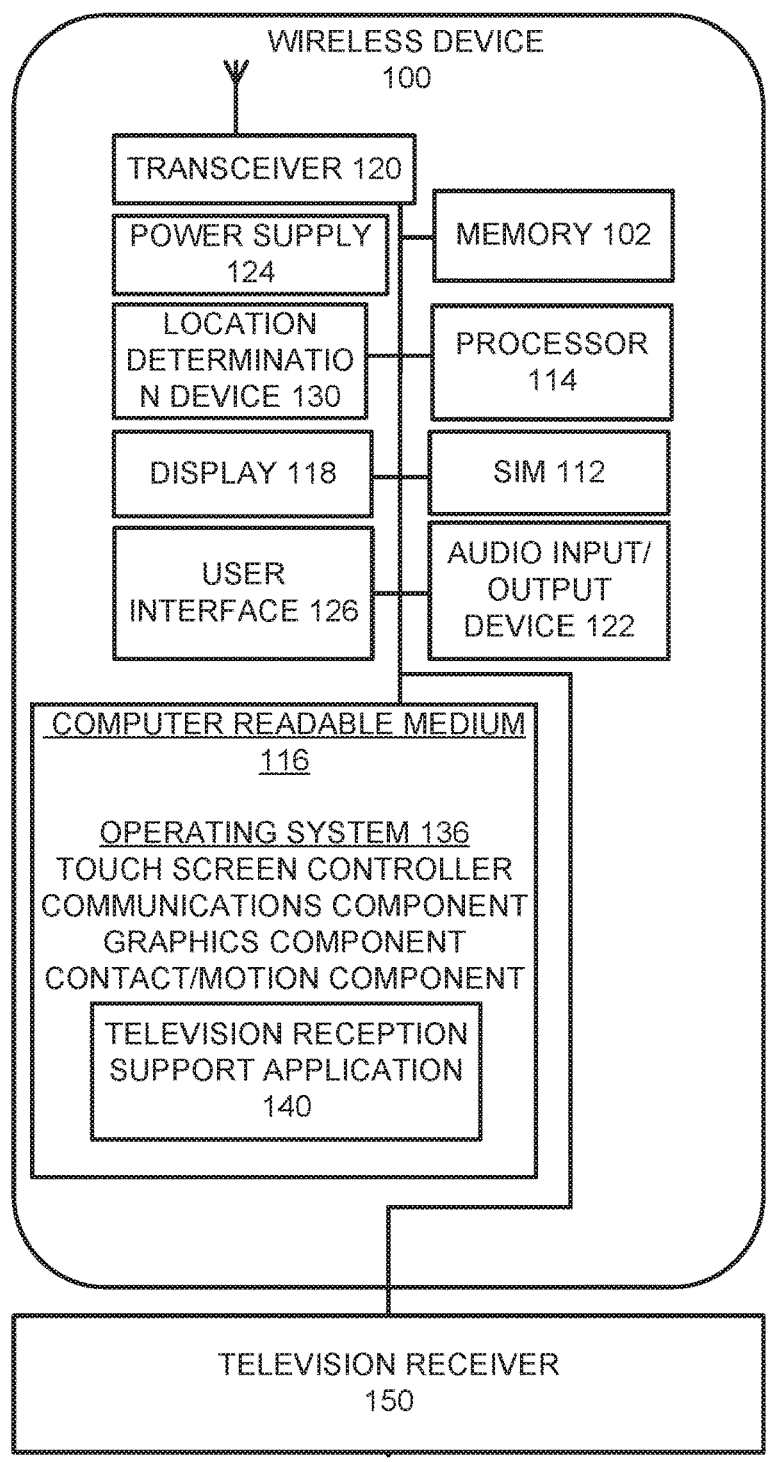
FIG. 2 illustrates another exemplary wireless device having a separate television receiver, in accordance with aspects of the disclosure.

FIG. 2 illustrates another exemplary wireless device and a separate television receiver, in accordance with aspects of the disclosure.

In particular, FIG. 2 illustrates an aspect where the television receiver 150 may be implemented as a separate device. In one aspect, the television receiver 150 may wirelessly connect to the wireless device 100 over a communication channel as defined herein. In one aspect, the television receiver 150 may be physically connected to the wireless device 100. In one aspect, the physical connection to the wireless device 100 may utilize a USB (Universal Serial Bus) connection. In this aspect, the USB connection may utilize USB specifications for cables, connectors and protocols for connection, communication, and/or power supply between the wireless device 100 and the television receiver 150. In this aspect, the USB specifications may include one or more USB 1.x, USB 2.0, USB 3.x, and/or the like. In one aspect, the physical connection to the wireless device 100 may utilize a Lightning computer bus and power connector. In this aspect, Lightning specifications for cables, connectors and protocols for connection, communication, and/or power supply may be utilized between the wireless device 100 and the television receiver 150.

Figure 3:
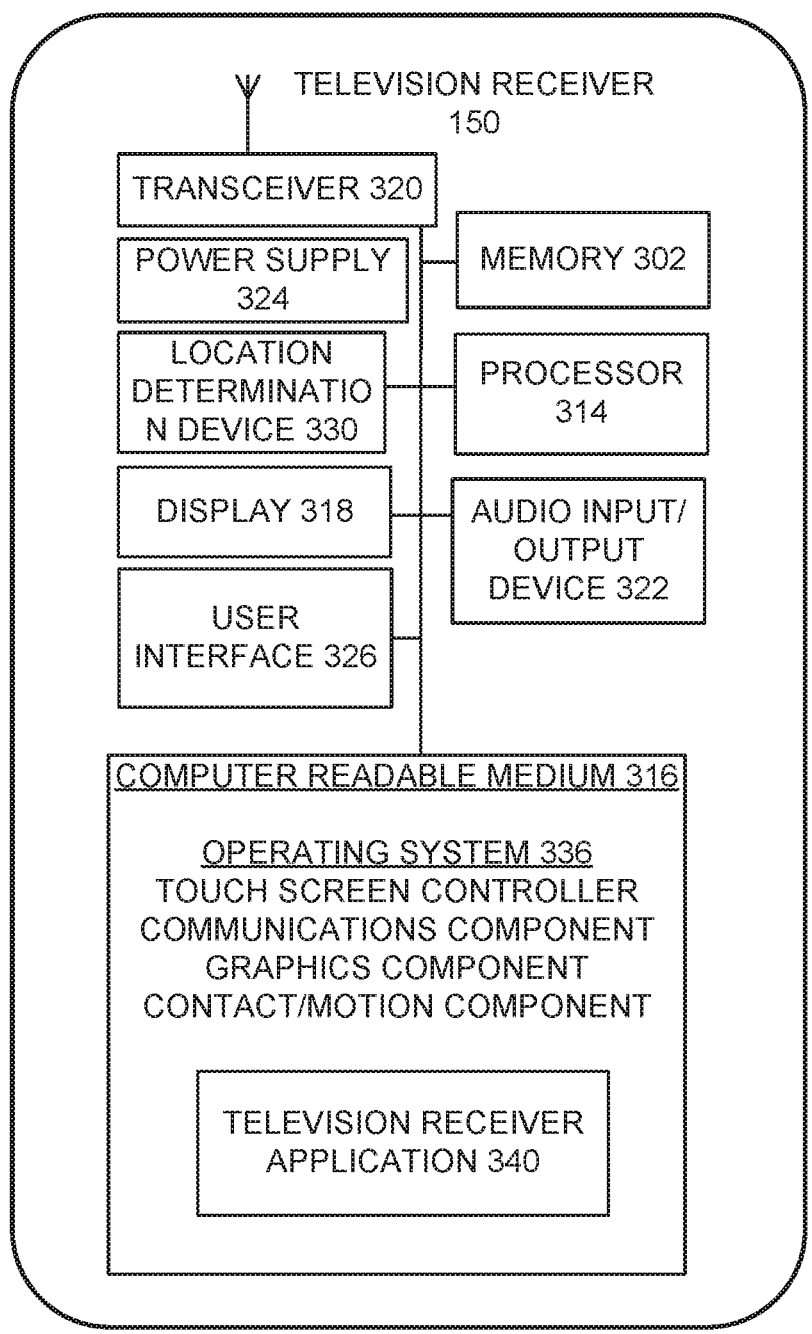
FIG. 3 illustrates a television receiver, in accordance with aspects of the disclosure.

FIG. 3 illustrates a television receiver, in accordance with aspects of the disclosure.

In particular, FIG. 3 illustrates an exemplary implementation of the television receiver 150. In this regard, the television receiver 150 may include one or more of a transceiver 320, a display 318, a computer readable medium 316, a processor 314, a television receiver application 340, a power supply 324, a location determination device 330, a user interface 326, a memory 302, an audio input/output device 322, an operating system 336, and/or the like. However, the television receiver 150 may be implemented with a greater number of components or a fewer number of components depending on the desired implementation. In one aspect, the features of the television receiver 150 may be utilized in the FIG. 1 aspect and/or the FIG. 2 aspect. In one aspect, the features of the television receiver 150 may utilize any other components, features, or the like set forth in the disclosure FIG. 4 illustrates an exemplary television broadcast network and wireless network as well as wireless devices, in accordance with aspects of the disclosure.

Figure 4:
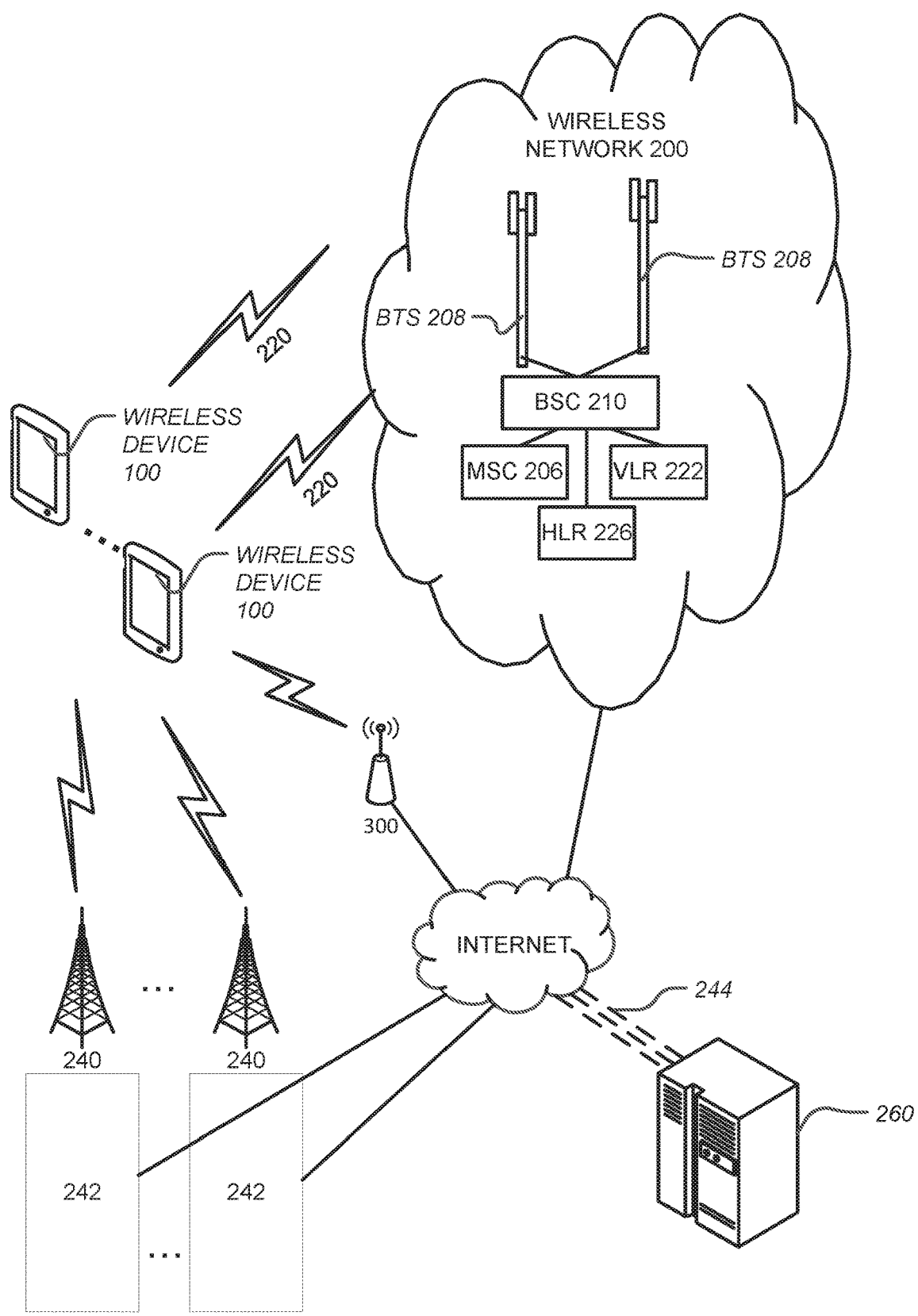
FIG. 4 illustrates an exemplary television broadcast network and wireless network as well as wireless devices, in accordance with aspects of the disclosure.

In particular, FIG. 4 illustrates a plurality of television stations 240, a plurality of broadcaster systems 242, a wireless network 200, and a broadcast television support platform 260. In one aspect, the television stations 240 may utilize and transmit Digital Terrestrial Television content. In one aspect, the Digital Terrestrial Television may utilize a technology for broadcast television in which land-based (terrestrial) television stations broadcast television content by radio waves to televisions as well as the television receiver 150 in a digital format. In one aspect, the television stations 240 may utilize Advanced Television Systems Committee (ATSC) standards. In one aspect, the television stations 240 may utilize Advanced Television Systems Committee 3.0 (ATSC 3.0) standards. In some aspects, the ATSC may include two primary high definition video formats, 1080i and 720p. In some aspects, the ATSC may also include standard-definition formats. In some aspects, the ATSC may support 5.1-channel surround sound using Dolby Digital's AC-3 format. In some aspects, the ATSC may include Moving Picture Experts Group (MPEG) video coding, AC-3 audio coding, 8VSB modulation, and/or the like.

In further aspects, in order provide more efficient use and viewing of different content by multiple users and/or multiple wireless devices 100 at the same time, broadcast signals using Internet protocol (IP) may be sliced and delivered using separate Internet protocol (IP) Ranges and Ports, which may take advantage of the television reception support application 140 and/or the broadcast television support platform 260. For example, the plurality of television stations 240 may utilize and transmit Digital Television content from the plurality of broadcaster systems 242 over the Internet to one or more of the broadcast television support platform 260, the wireless device 100, and/or the wireless network 200. In particular aspects, the plurality of television stations 240 may utilize and transmit Digital Television content from the plurality of broadcaster systems 242 utilizing Internet protocol (IP). In this regard, the Digital Television content utilizing Internet protocol (IP) may be sliced 244 by the broadcast television support platform 260 and delivered using separate Internet protocol (IP) Ranges and Ports. The wireless device 100 may receive the Digital Television content utilizing Internet Protocol (IP) that has been sliced 244 and delivered using separate Internet protocol (IP) Ranges and Ports by the television reception support application 140, the television receiver 150, and/or the transceiver 120. In certain aspects, the wireless device 100 may receive the Digital Television content utilizing Internet protocol (IP) from the wireless network 200, the plurality of broadcaster systems 242, a wireless fidelity access point 300, the broadcast television support platform 260, the Internet, and/or the like, and/or combinations thereof. In this regard, the broadcast television support platform 260 in conjunction with the television reception support application 140, the television receiver 150, and/or the transceiver 120 may bridge television broadcast with Internet protocol (IP) content.

As illustrated in FIG. 4, the wireless device 100 may receive the Digital Terrestrial Television by radio waves in a digital format. In one aspect, the wireless device 100 may receive the Digital Terrestrial Television by radio waves in a digital format utilizing ATSC 3.0. In particular, the wireless device 100 may receive the television signals utilizing the television receiver 150 as illustrated in any one or more of FIG. 1, FIG. 2, and FIG. 3. Additionally, the wireless device 100 may receive the Digital Television in a digital form at utilizing Internet protocol (IP) from the wireless network 200, the plurality of broadcaster systems 242, a wireless fidelity access point 600, the broadcast television support platform 260, the Internet, and/or the like, and/or combinations thereof.

Other digital television broadcast standards may be utilized including DVB standards, DVB-T, DVB-T2, DVB-S, DVB-S2, DVB-S2X, DVB-C, DVB-C2, DVB-H, DVB-NGH, DVB-T2-Lite, DVB-SH, ATSC 2.0, ATSC-M/H, ISDB, ISDB-T, ISDB-T, SBTVD, ISDB-S, ISDB-C, 1seg, DTMB, DTMB, DTMB-A, CMMB, DMB standard, T-DMB, S-DMB, and/or the like. The digital television broadcast may utilize various Codecs including H.265/MPEG-H HEVC, H.264/MPEG-4 AVC, H.262/MPEG-2 Part 2, VC-1, AVS, MPEG-H, HE-AAC, AAC, AC-4, E-AC-3, AC-3, MP3, MP2, the like. The digital television broadcast may utilize various frequency bands including VHF (Very High Frequency), UHF (Ultra High Frequency), SHF (Super High Frequency), and/or the like.

FIG. 4 further illustrates the broadcast television support platform 260. In one aspect, the broadcast television support platform 260 may be implemented as a computer system. In one aspect, the broadcast television support platform 260 may be implemented as a server computer system.

Additionally, FIG. 4 shows a wireless network 200 that may include a Mobile services Switching Center (MSC) 206 that may perform the switching of calls and that may include a Visitor Location Register (VLR) 222. The wireless network 200 may also include a Base Transceiver Station (BTS) 208 and a Base Station Controller (BSC) 210. The Base Transceiver Station (BTS) 208 houses the radio transceivers that define a cell and handle the radio-link protocols with the wireless device 100. The Base Station Cant roller (BSC) 210 may manage the radio resources for one or more Base Transceiver Station (BTS) 208. The Base Station Controller (BSC) 210 may be the connection between the wireless device 100 and the Mobile service Switching Center (MSC) 206.

A Home Location Register (HLR) 226 and the Visitor Location Register (VLR) 222 together with the Mobile services Switching Center (MSC) 206 may provide the call-routing and roaming capabilities. The Home Location Register (HLR) 226 may contain all the administrative information of each subscriber registered in the wireless network 200, along with the current location of the wireless device 100.

The wireless network 200 may include a home subscriber server (HSS), a user profile server function (UPSF), and/or the like. The HSS may be a master user database that supports IP Multimedia Core Network Subsystem (IMS) network entities. The HSS may contain the subscription-related information (subscriber profiles), perform authentication and authorization of the user, and/or can provide information about the subscriber's location and IP information.

The wireless network 200 may further include a switch. The switch may be implemented by one or more of the Mobile services Switching Center (MSC) 206, the Home Location Register (HLR) 226, the Visitor Location Register (VLR) 222, the Base Transceiver Station (BTS) 208, the Base Station Controller (BSC) 210, the home subscriber server (HSS), a separate component, and/or the like.

The wireless network 200 may include a radio access network (RAN). The radio access network (RAN) may be implemented as part of a mobile telecommunication system of the wireless network 200. The radio access network (RAN) may implement a radio access technology. The radio access network (RAN) may reside between the wireless device 100 and the wireless network 200 and may provide a connection with a core network (CN).

In one aspect, the wireless network 200 may connect to the wireless device 100 over communication channels 220 as defined herein. The wireless network 200 may connect the wireless device 100 to the broadcast television support platform 260. In this regard, the wireless device 100, the television reception support application 140, and the broadcast television support platform 260 may exchange data including data regarding DVR functionality, programming information, television guide information, channel access and display information, polices, subscription rules, and subscriber status, and/or the like.

In further aspects, the wireless device 100 may connect to a wireless fidelity network that provides access to the Internet. The wireless fidelity network may connect the wireless device 100 to the broadcast television support platform 260. In this regard, the wireless device 100, the television reception support application 140 and the broadcast television support platform 260 may exchange data including data regarding data relating to DVR functionality, programming information, television guide information, channel access and display information, polices, subscription rules, and subscriber status, and/or the like.

Figure 5:
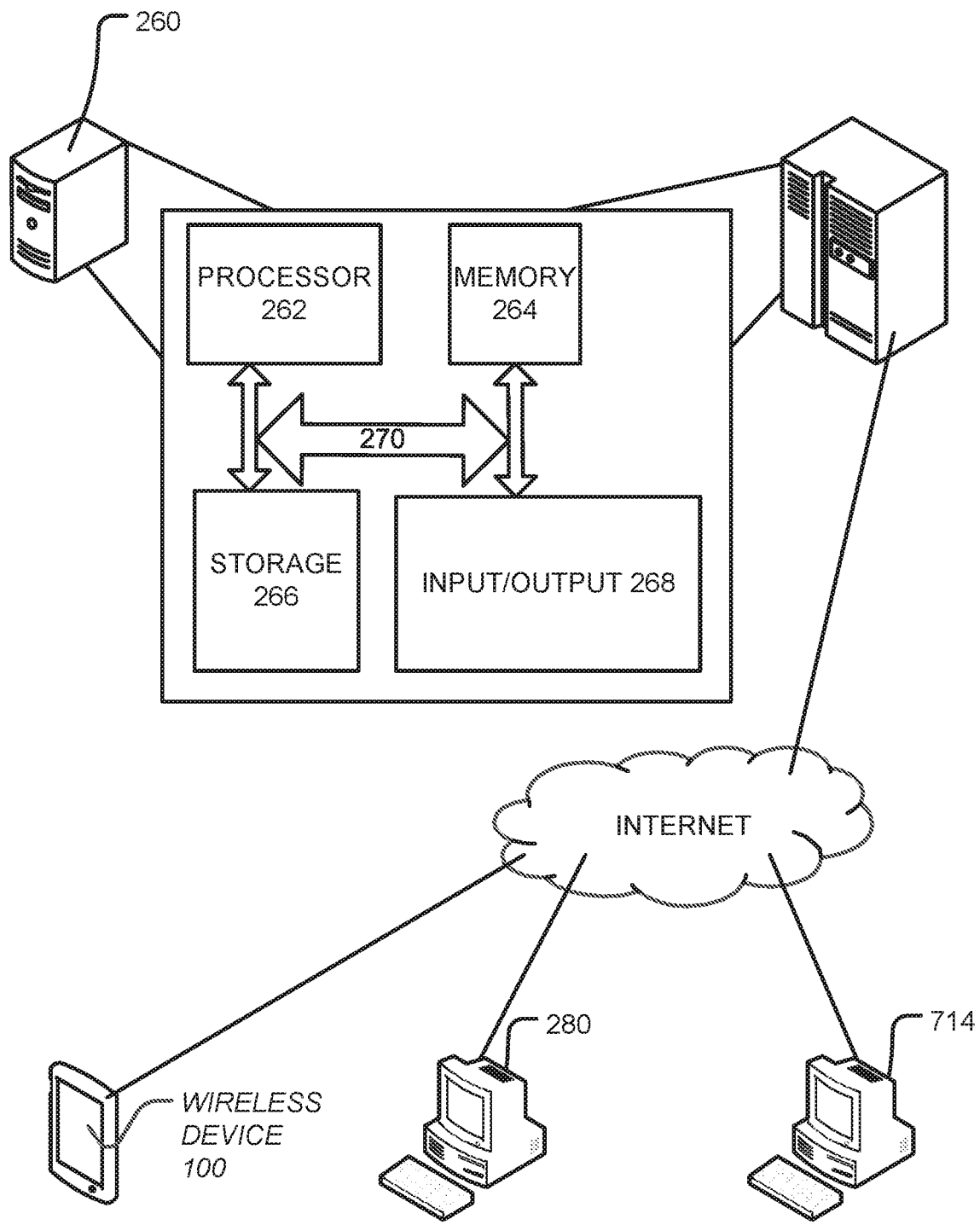
FIG. 5 illustrates a broadcast television support platform, in accordance with aspects of the disclosure.

FIG. 5 shows a schematic diagram of an exemplary broadcast television support platform 260 or platform that can be used to implement television services for the wireless device 100 and/or the television receiver 150. In particular, the broadcast television support platform 260 may operate to provide some or all of the television services functionality as described herein including, for example, DVR functionality, programming information, television guide information, channel access and display information, polices, subscription rules, and subscriber status, and/or the like. The broadcast television support platform 260 may include a processor 262, a memory 264, a storage device 266, and an input/output device 268. Each of the processor 262, the memory 264, the storage device 266, and the input/output device 268 can, for example, may be interconnected using a system bus 270. The processor 262 may be capable of processing instructions for execution within the broadcast television support platform 260. In one implementation, the processor 262 is a single-threaded processor. In another implementation, the processor 262 is a multi-threaded processor. The processor 262 may be configured for processing instructions stored in the memory 264 or on the storage device 266 to provide communications to the wireless device 100. The processor 262 may be configured for processing instructions stored in the memory 264 or on the storage device 266 that include a process 800 described below and illustrated in FIG. 8. In some aspects, a parallel processing set of the broadcast television support platform 260 may be connected over a network may be employed, clustered into one or more server centers.

The memory 264 may store information within the broadcast television support platform 260. In one implementation, the memory 264 is a computer-readable medium. In one implementation, the memory 264 is a volatile memory unit. In another implementation, the memory 264 is a non-volatile memory unit. The storage device 266 may be configured for providing mass storage for the broadcast television support platform 260. In one implementation, the storage device 266 is a computer-readable medium. In various different implementations, the storage device 266 can, for example, include a hard disk device, an optical disk device, and/or some other large capacity storage device. In one aspect, the storage device 266 may store information and data regarding the wireless device 100 as well as data, information, and for implementing software DVR functionality, programming information, television guide information, channel access and display information, polices, subscription rules, and subscriber status, and/or the like.

The input/output device 268 may provide input/output operations for the broadcast television support platform 260. In one aspect, the input/output device 268 may include a transceiver configured to connect the broadcast television support platform 260 to the wireless device 100 over a network such as the Internet. In one aspect, input/output device 268 may provide input/output operations for the broadcast television support platform 260 including information, data, and software with respect to the DVR functionality, programming information, television guide information, channel access and display information, polices, subscription rules, and subscriber status, and/or the like. In one aspect, the broadcast television support platform 260 may be configured to connect to a computer 280 directly or over the Internet. In one aspect, the computer 280 may provide administrative input and control to the broadcast television support platform 260.

In one aspect, the processor 262 may include an Application Programming Interface (API). More specifically, the processor 262 may include one or more Application Programming Interfaces (API) such that the processor 262 provides television services to the wireless device 100 and/or the television receiver 150 that may include one or more of the DVR functionality, programming information, television guide information, channel access and display information, polices, subscription rules, and subscriber status, and/or the like.

The processor 262 may further utilize artificial intelligence as well. In some aspects, the processor 262 may utilize artificial intelligence to control and/or provide the DVR functionality, programming information, television guide information, channel access and display information, polices, subscription rules, and subscriber status, and/or the like.

The artificial intelligence as described herein may utilize any number of approaches including one or more of cybernetics and brain simulation, symbolic, cognitive simulation, logic-based, anti-logic, knowledge-based, sub-symbolic, embodied intelligence, computational intelligence and soft computing, machine learning and statistics, and/or the like.

Figure 6:
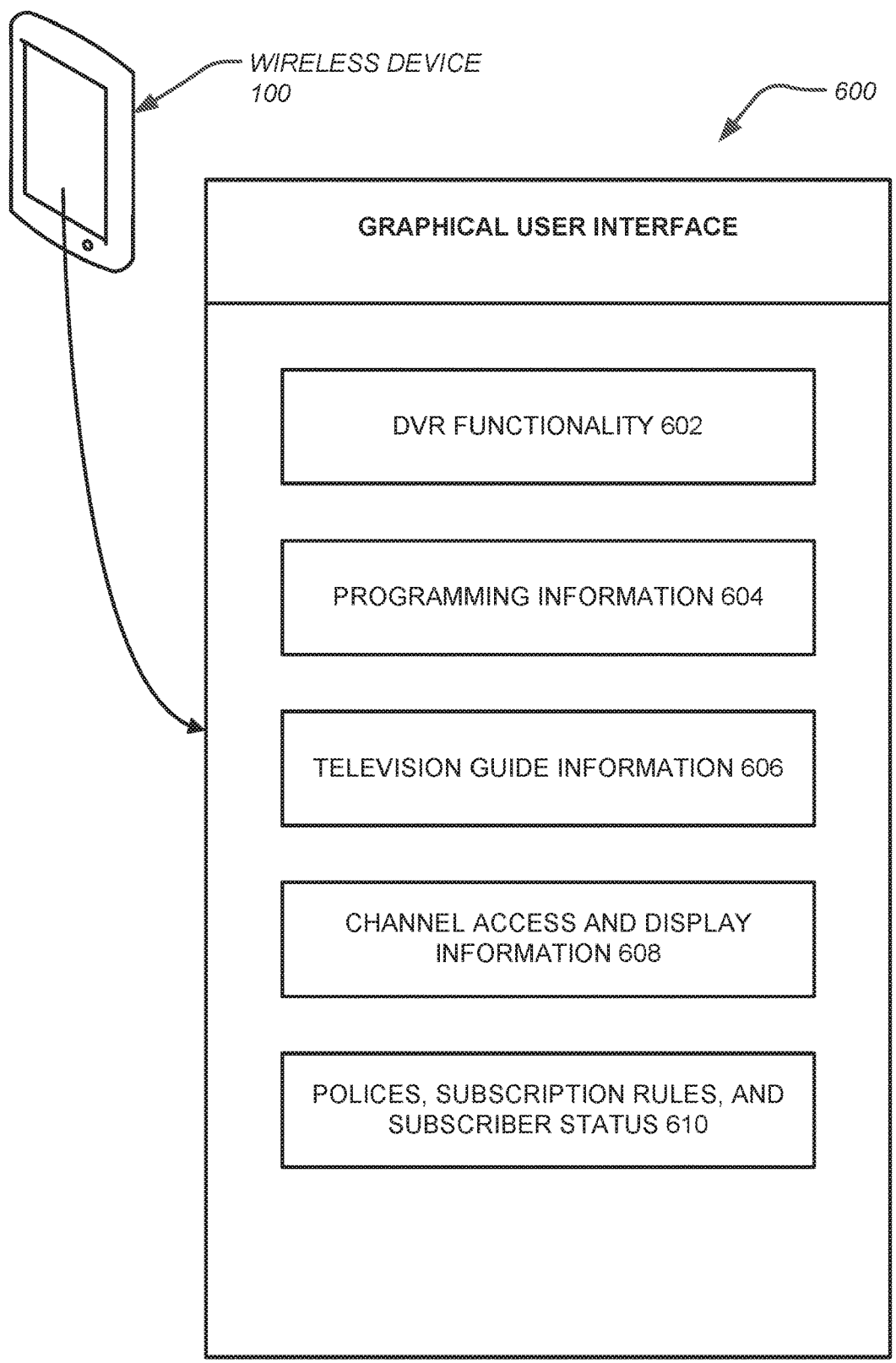
FIG. 6 illustrates a graphical user interface for a wireless device in accordance with aspects of the disclosure.

FIG. 6 illustrates a graphical user interface for a wireless device in accordance with aspects of the disclosure.

In particular, FIG. 6 illustrates a graphical user interface 600 that may be generated by the television reception support application 140. The graphical user interface 600 may include touch sensitive inputs that may include inputs to launch additional functionality, different menus, different buttons, different input, and/or the like. The inputs may include a DVR functionality input 602, a programming information input 604, a television guide information input 606, a channel access and display information input 608, a polices, subscription rules, and subscriber status input 610. In one aspect, a user selecting one of the inputs may launch a separate graphical user interface dedicated to the input that provides information, allows selection, allows modification, and/or the like associated with the input. However, the graphical user interface 600 may be implemented with a greater number of inputs or a fewer number of inputs depending on the desired implementation and the desired features consistent with the disclosure.

Figure 7:
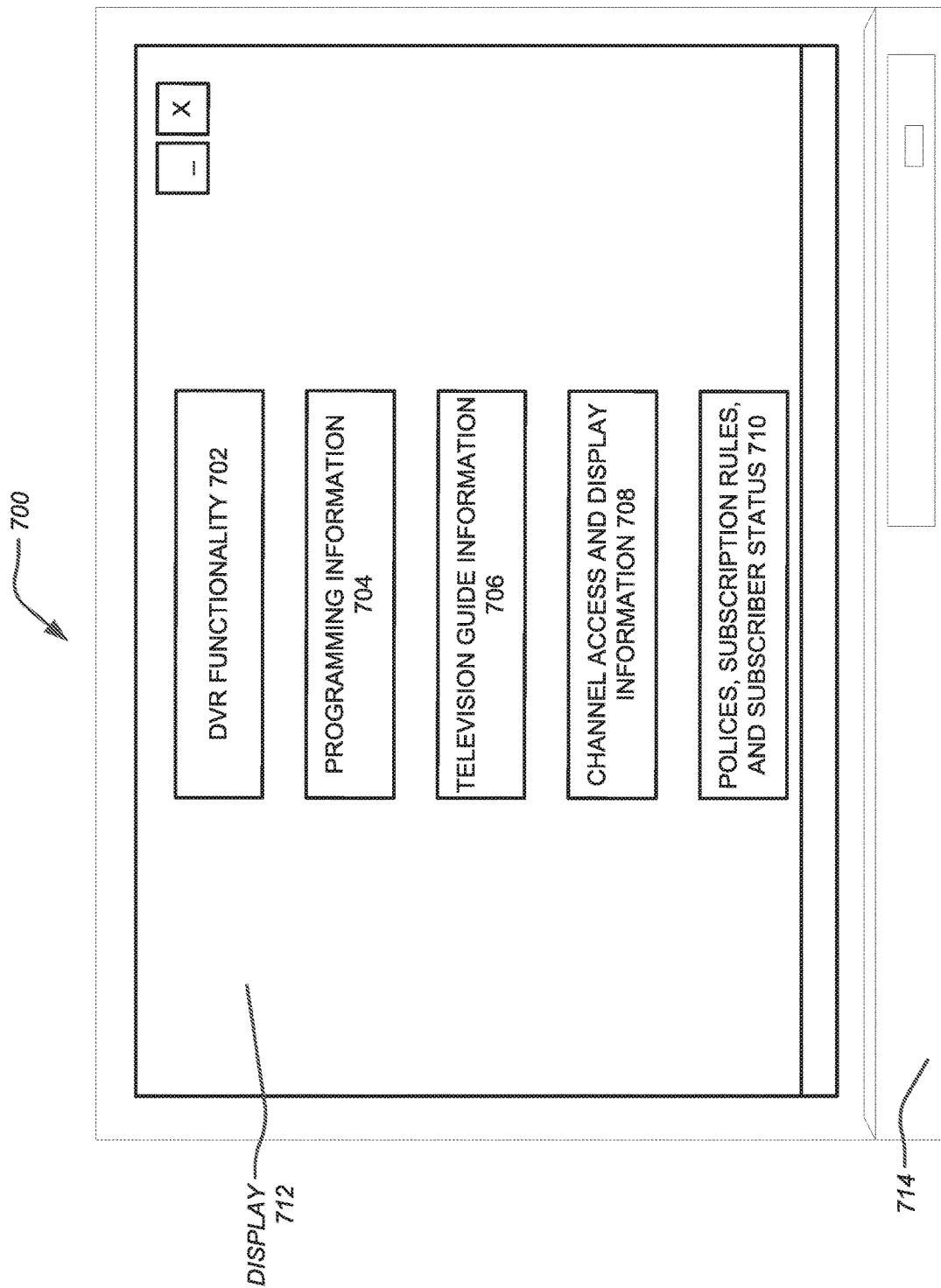
FIG. 7 illustrates a graphical user interface for an Internet enabled device in accordance with aspects of the disclosure.

FIG. 7 illustrates a graphical user interface for an Internet enabled device in accordance with aspects of the disclosure.

In particular, FIG. 7 illustrates a graphical user interface 700 that may be generated by a display 712 of an Internet enabled device 714. The Internet enabled device may be a tablet computer, a laptop computer, a PC, or the like. In one aspect, the graphical user interface 700 may be generated in association with a webpage provided by the broadcast television support platform 260. The graphical user interface 700 may include touch sensitive inputs, mouse control selection of the inputs, and/or the like that may include inputs to launch additional functionality. The inputs may include a DVR functionality input 702, a programming information input 704, a television guide information input 706, a channel access and display information input 708, a polices, subscription rules, and subscriber status input 710. In one aspect, a user selecting one of the inputs may launch a separate graphical user interface or webpage dedicated to the input that provides information, allows selection, allows modification, and/or the like associated with the input. However, the graphical user interface 700 may be implemented with a greater number of inputs or a fewer number of inputs depending on the desired implementation and the desired features consistent with the disclosure.

Figure 8:
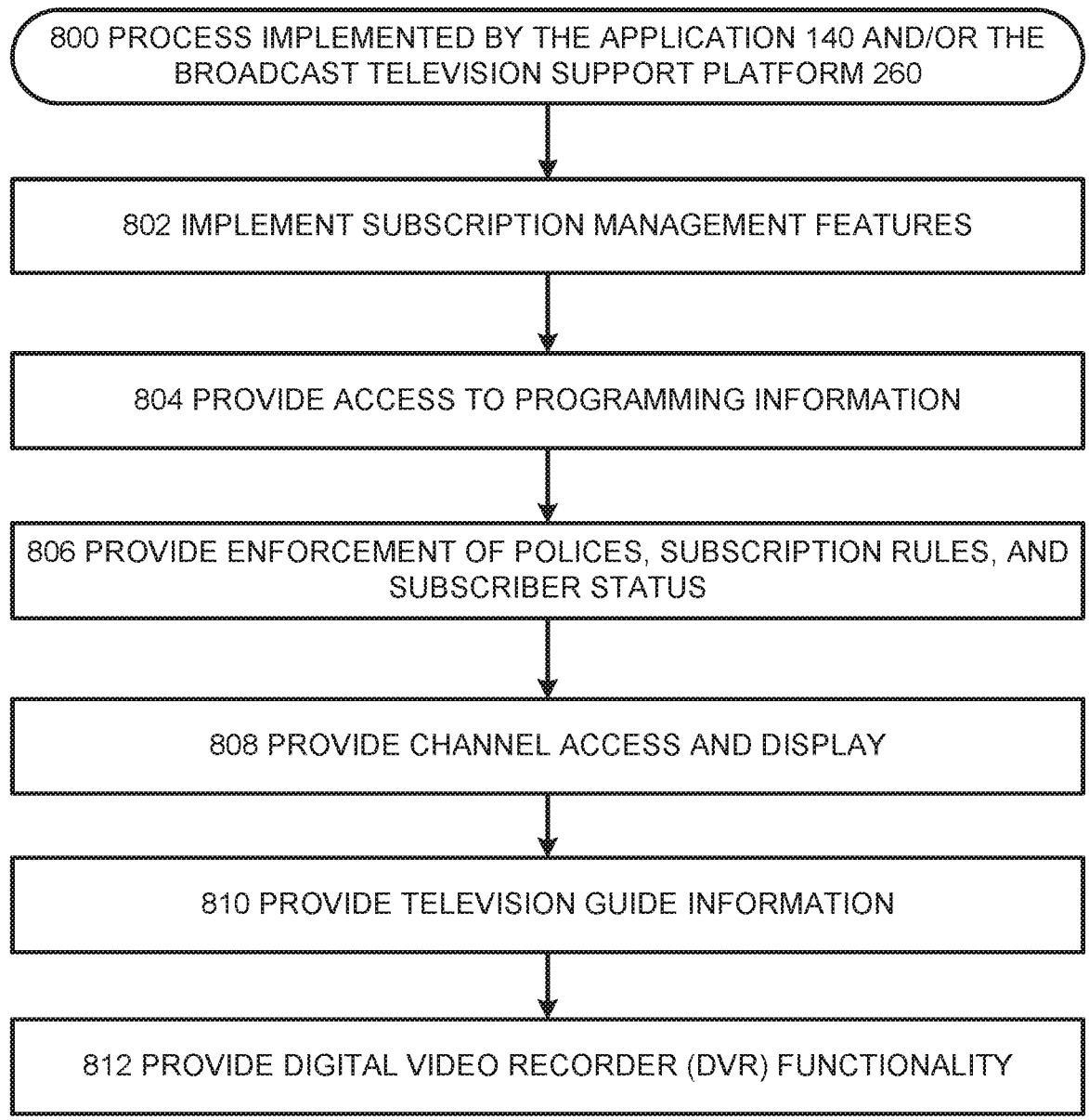
FIG. 8 illustrates a process of implementing a broadcast television support platform and/or an application responsive to a broadcast television support platform, in accordance with aspects of the disclosure.

FIG. 8 illustrates a process of implementing a broadcast television support platform and/or an application responsive to a broadcast television support platform, in accordance with aspects of the disclosure.

In particular, FIG. 8 illustrates a process 800 that may be implemented by the television reception support application 140 and/or the broadcast television support platform 260 such that the wireless device 100 and/or the television receiver 150 may implement various features. It should be noted that the aspects of the process 800 may be performed in a different order consistent with the aspects described herein. Moreover, the process 800 may be modified to have more or fewer processes consistent with the various aspects disclosed herein.

In one aspect, the process 800 may implement subscription management features 802. In particular, box 802 may allow a user of the wireless device to control subscription management features as described herein. In one aspect, the television services as described by this disclosure may include subscription to various information, features, data, and/or the like provided by the television reception support application 140 and/or the broadcast television support platform 260. In one aspect, the process 800 may be configured to add, modify, or the like subscription to the various information, features, data, and/or the like provided by the television reception support application 140 and/or the broadcast television support platform 260. In one aspect, the television reception support application 140 may be configured to generate a graphical user interface to display controls to view, utilize, implement, add, delete, modify, and/or the like subscription to the various information, features, data, and/or the like provided by the television reception support application 140 and/or the broadcast television support platform 260. This process may further include additional features as described herein.

In one aspect, the process 800 may implement access to programming information 804. In particular, box 804 may allow a user of the wireless device to access programming information as described herein. In one aspect, the television reception support application 140 may be configured to generate a graphical user interface to vie utilize, implement, add, delete, modify, and/or the like programming information provided by the television reception support application 140 and/or the broadcast television support platform 260. In one aspect, the television reception support application 140 may be configured to generate a graphical user interface to display controls to view, utilize, implement, add, delete, modify, and/or the like the programming information provided by the television reception support application 140 and/or the broadcast television support platform 260. In one aspect, the programming information may include Electronic program guides (EPGs) and/or interactive program guides (IPGs) that may be menu-based systems that provide users of the television reception support application 140 with continuously updated menus displaying broadcast programming (TV listings) or scheduling information for current and upcoming programming. This process may further include additional features as described herein.

In one aspect, the process 800 may provide access and/or provide enforcement of polices, subscription rules, and subscriber status 806 as described herein. In one aspect, the policies may be enforced by the television reception support application 140 that are provided by the broadcast television support platform 260. In one aspect, the broadcast television support platform 260 may be configured to generate a graphical user interface to view, utilize, implement, add, delete, modify, and/or the like policies based upon subscription rules and subscriber status. This process may further include additional features as described herein.

In one aspect, the process 800 may provide access and/or provide channel access and display 808 as described herein.

In one aspect, the television reception support application 140 may be configured to generate a graphical user interface to view, utilize, implement, add, delete, modify, and/or the like channel access provided by the television reception support application 140 and/or the broadcast television support platform 260. In one aspect, the television reception support application 140 may be configured to generate a graphical user interface to display television programming provided by the television reception support application 140 and/or the broadcast television support platform 260. In one aspect, the television reception support application 140 may be configured to generate a graphical user interface to display television programming provided by the television reception support application 140 and/or the broadcast television support platform 260 based on location of the wireless device 100. This process may further include additional features as described herein.

In one aspect, the process 800 may provide access and/or provide television guide information 810 as described herein. In one aspect, the television guide information may be provided by paid subscription. The television guide information may include channels, television shows, sporting events, times, length of shows, cast, production crew and personnel biographies, plot summaries, trivia, and fan reviews and ratings, and/or the like. In one aspect, the television reception support application 140 may include a graphical user interface to search the television guide to find television content. This process may further include additional features as described herein.

In one aspect, the process 800 may provide access and/or provide digital video recorder (DVR) functionality 812 as described herein. In one aspect, digital video recorder (DVR) functionality may include the ability to record, pause, fast-forward, rewind, and/or the like the received television signals. In one aspect, digital video recorder (DVR) functionality may include the ability to select and play back the particular television programming stored in the memory 102. In one aspect, digital video recorder (DVR) functionality may include the ability to delete the particular television programming stored in the memory 102. This process may further include additional features as described herein.

Figure 9:
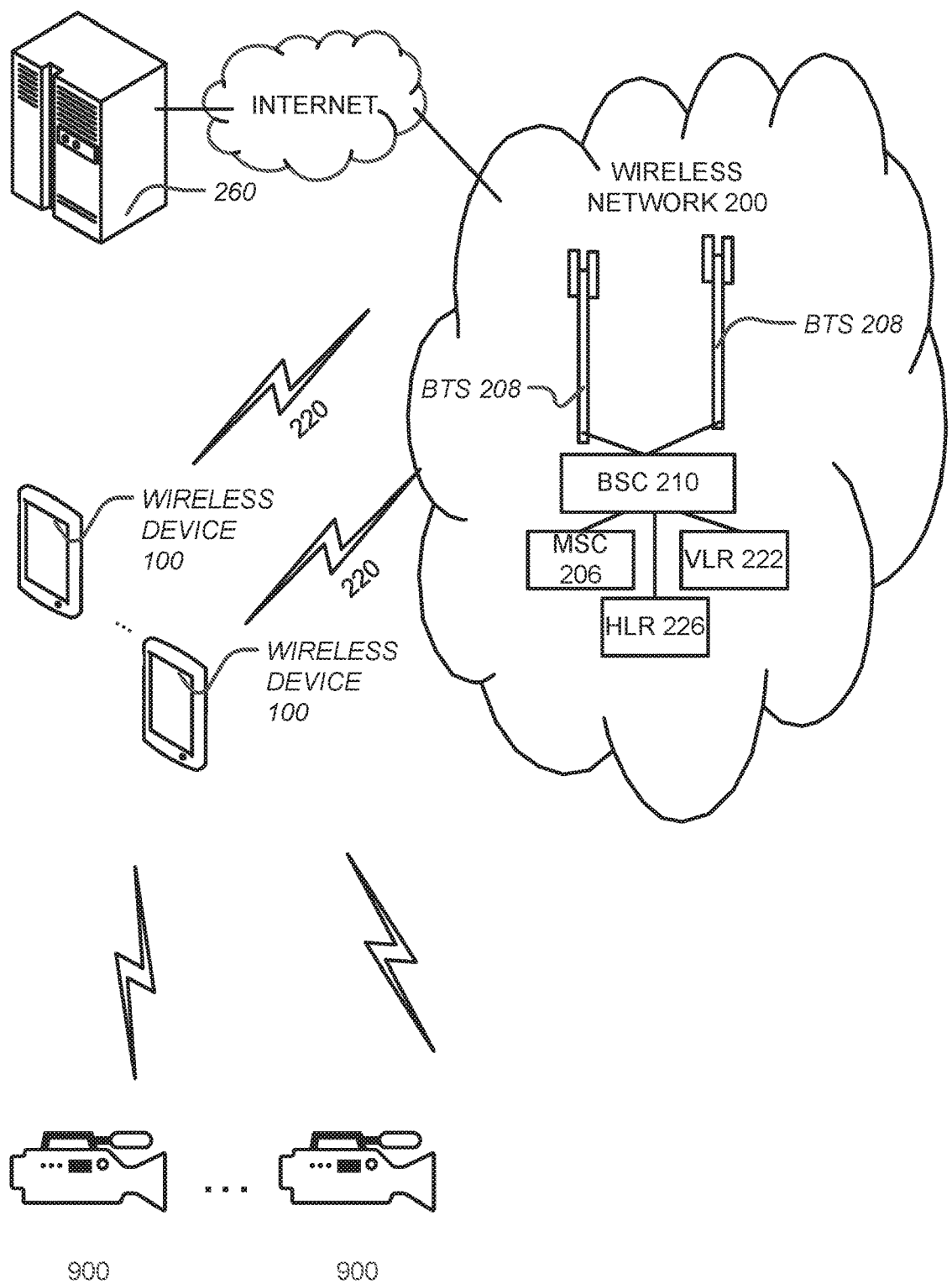
FIG. 9 illustrates an exemplary closed-circuit broadcast network and wireless network as well as wireless devices, in accordance with aspects of the disclosure.

FIG. 9 illustrates an exemplary closed-circuit broadcast network and wireless network as well as wireless devices, in accordance with aspects of the disclosure.

As illustrated in FIG. 9, the wireless device 100, the television receiver 150, and/or the broadcast television support platform 260 may be configured to provide Closed Circuit Television Broadcasts (CCT) for Enterprise, Proprietary and Security Broadcasts, and/or the like to a wireless device 100. In particular, one or more video cameras 900 may be implemented to capture video and transmit the video to the wireless device 100 using any wired or wireless radio frequency technology as described herein. Accordingly, the aspect of FIG. 9 provides a quick and efficient system to implement Enterprise, Proprietary and Security Broadcasts, and/or the like to a wireless device 100.

Accordingly, the disclosure has set forth a platform for enabling and managing mobile smart television, enabling and managing mobile smart television broadcast, enabling and managing mobile smart television reception, enabling and managing mobile smart television usage, and/or the like. Additionally, the disclosure has set forth a process for enabling and managing mobile smart television, enabling and managing mobile smart television broadcast, enabling and managing mobile smart television reception, enabling and managing mobile smart television usage, and/or the like.

Additionally, the disclosure has set forth devices, systems, and processes utilizing new opportunities based upon advances in Television Broadcast technology that may use Internet Protocols, Mobile Phone chipset technologies, and/or the like. The disclosure implementing a Mobile Smart Television integrated into a Smartphone utilizing a television receiver such as an Advanced Television Systems Committee 3.0 (ATSC 3.0) compliant receiver, a Software-Defined Radio (SDR) receiver chip, or equivalent components, a native subscription management software application that may be implemented without the need for a Cellular, Internet, or Broadband connection, along with a remote policy management system, such as server, that may enable:

Free Local high definition Television Broadcasts and Programming.

Paid Local high definition Television Broadcasts and Programming.

Sponsored high definition Television Broadcasts and Programming.

Subscription Based high definition Television Programming (for example, pay Per View, Netflix, Hulu, Disney+, Personal Media and Cloud Storage, and others).

Closed Circuit Television (CCT) Broadcasts for Enterprise, Proprietary and Security Broadcasts, and/or the like.

As described herein, the disclosure has set forth a television receiver 150 and a broadcast television support platform 260 that may be configured to provide free Local high definition Television Broadcasts and Programming to a wireless device 100. As described herein, the disclosure has also set forth a television receiver 150 and a broadcast television support platform 260 that may be configured to provide paid Local high definition Television Broadcasts and Programming to a wireless device 100. As described herein, the disclosure has also set forth a television receiver 150 and a broadcast television support platform 260 that may be configured to provide Sponsored high definition Television Broadcasts and Programming to a wireless device 100. As described herein, the disclosure has also set forth a television receiver 150 and a broadcast television support platform 260 that may be configured to provide Subscription Based high definition Television Programming (for example, pay Per View, Netflix, Hulu, Disney+, Personal Media and Cloud Storage, and others) to a wireless device 100. As described herein, the disclosure has also set forth a television receiver 150 and a broadcast television support platform 260 that may be configured to provide Closed Circuit Television Broadcasts (CCT) for Enterprise, Proprietary and Security Broadcasts, and/or the like to a wireless device 100.

A large number of wireless service plans exist for customers desiring wireless services such as data, talk, and text messaging. To obtain these wireless services, customers generally have the option of entering into a post-paid service (e.g., contract for a period of time) or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNO) that maintain and control their own wireless networks. A MNO heavily relies on backend systems to address any provisional, billing, security, and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data, number of minutes of airtime/voice, and number of text messages used. In this regard, MVNOs may have a plurality of agreements with and the rights to use a plurality of MNO networks.

Convenience, timeliness, cost, service, and reliability of a wireless device and/or the wireless providers' systems are key factors that play into a user's experience. By developing a system to improve at least these factors, a more positive experience can be provided to the wireless user. The improved experience will help retain customer base and increase the number of customers willing to purchase wireless services. In order to do so, the following needs can be addressed by a platform for enabling and managing a mobile smart television, a process for enabling and managing a mobile smart television, and/or a mobile smart television that may be utilized by either MNOs or MVNOs. In one aspect, the broadcast television support platform 260 may be implemented in a MNO. In one aspect, the broadcast television support platform 260 may be implemented by a MNO. In one aspect, the broadcast television support platform 260 may be implemented in a MVNO. In one aspect, the broadcast television support platform 260 may be implemented by a MVNO.

Further in accordance with various aspects of the disclosure, the methods described herein are intended for operation with dedicated hardware implementations including, but not limited to processors, microprocessors, wireless device chipsets, PCs, PDAs, SIM cards, semiconductors, application specific integrated circuits (ASIC), programmable logic arrays, cloud computing devices, and other hardware devices constructed to implement the methods described herein.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The wireless networks 200 may include a Mobility Management Entity (MME). The MME may function as a key control-node. The MME may be responsible for idle mode of the wireless device 100 as well as paging and tagging procedures including retransmissions. The MME may be involved in the bearer activation/deactivation process and may also responsible for choosing a Signaling Gateway (SGW) for the wireless device 100 at the initial attach and at a time of intra-LTE handover involving Core Network (CN) node relocation. The MME may be responsible for authenticating the wireless device 100 by interacting with a home subscriber server (HSS). Non Access Stratum (NAS) signaling may terminate at the MME and may also be responsible for generation and allocation of temporary identities to the wireless device 100. The MME may check the authorization of the wireless device 100 to camp on the service provider's Public Land Mobile Network (PLMN) and may enforce roaming restrictions on the wireless device 100. The MME may be a termination point in the wireless network 200 for ciphering/integrity protection for NAS signaling and may handle the security key management. The MME may also provide a control plane function for mobility between LTE and 2G/3G access networks with an S3 interface terminating at the MME from the Serving GPRS Support Node (SGSN). The MME may also terminate an S6a interface towards the home HSS for a roaming wireless device 100.

The SGW may be implemented as a network component responsible for transferring signaling messages (i.e. information related to call establishment, billing, location, short messages, address conversion, and other services) between Common Channel Signaling (CCS) nodes that communicate using different protocols and transports.

In one aspect, the wireless network 200 may include a public data network (PDN) gateway (PDN GW), The PDN GW may contain devices such as protocol translators, impedance matching devices, rate converters, fault isolators, or signal translators as necessary to provide system interoperability. The PDN GW may also require the establishment of mutually acceptable administrative procedures between networks.

The PDN may be a circuit-switched or packet-switched network that can transmit data in digital form. The PDN may provide any of X.25, frame relay, cell relay (ATM), or the like services. Access to a PDN generally includes a guaranteed bandwidth, known as the committed information rate (CIR).

In one aspect, the wireless network 200 may include an S5/S8 interface that may be used within the Evolved Packet Core (EPC) for LTE. The S5 interface may provide user plane tunneling and tunnel management between a serving GW and PDN GW. It may be used for Serving GW relocation due to the wireless device 100 mobility and if the serving GW needs to connect to a non-collocated PDN GW for the required PDN connectivity.

According to an example, the global navigation satellite system (GNSS) may include a device and/or system that may estimate its location based, at least in part, on signals received from space vehicles (SVs) for the wireless device 100. In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may include, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The disclosure may include communication channels 220 that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO), 4G, 5G, and/or the like, and/or a combination of two or more thereof.

The television reception support application 140 described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system, or the like.

The disclosure may be implemented in any type of computing devices or processor, such as, e.g., a microprocessor, wireless device chipset, a desktop computer, personal computer, a laptop/mobile computer, a personal data assistant (PDA), a mobile phone, a tablet computer, cloud computing device, and/or the like, with wired/wireless communications capabilities via the communication channels 220.

In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

The term text, text message, messaging services, or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, 5G networks or networks associated with the communication channel as defined herein. In other aspects, text message may include Multimedia Messaging Service (MMS), which is a standard way to send messages that include multimedia content to and from mobile phones. It extends the core SMS (Short Message Service) capability that allowed exchange of text messages only up to 160 characters in length. While the most popular use is to send photographs from camera-equipped handsets, it is also used as a method of delivering news and entertainment content including videos, pictures, text pages, and ringtones. MMS can be used within the context of the disclosure for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet.

The term talk, voice, voice services, or voice calls as utilized herein may include voice calls defined by 3GPP (3rd Generation Partnership Project) with Voice Call Continuity (VCC) specifications in order to describe how a voice call can be persisted, as a mobile phone moves between circuit switched and packet switched radio domains (3GPP TS 23.206).

The term data or data services as utilized herein includes mobile broadband or wireless Internet access delivered through mobile phone towers over a communication channel as defined herein to computers, mobile phones, wireless devices, and other digital devices as defined herein using portable modems. Some mobile services allow more than one device to be connected to the Internet using a single cellular connection using a process called tethering.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Aspects of the disclosure include an Application Programming Interface (API). The API may include a set of subroutine definitions, protocols, and tools for building software. The set may include a set of defined methods of communication between the various components of the disclosure. The API may be implemented as a web-based system, an operating system, a database system, a computer hardware, a software library, or the like. The API may include an API specification that may include specifications for routines, data structures, object classes, variables, remote calls, and/or the like. The API may be associated with or related to a software library. The API may describe and prescribe the expected behavior as a set of rules and the software library may be an implementation of this set of rules. In one aspect, the API may be a remote API configured to manipulate remote resources through protocols, specific standards for communication, or the like that allow different technologies to work together, regardless of language or platform. In one aspect, the API may be POSIX, Windows API. In one aspect, the API may be ASPI. In one aspect, the API may be Java API. In one aspect, the API may be Java Database Connectivity API.

Voice recognition software may be utilized in various aspects of the systems and methods. Users may be able to vocalize, rather than utilizing other input processes. For example, the voice recognition software may be configured for generating text from voice input from a microphone or other voice input. A speech signal processor may convert speech signals into digital data that can be processed by the processor. The processor may perform several distinct functions, including serving as the speech event analyzer, the dictation event subsystem, the text event subsystem, and the executor of the application program. The speech signal processor may generate speech event data and transmit this data to the processor to be processed first by the speech event analyzer. The speech event analyzer may generate a list or set of possible candidates among the system recordings that represent or match the voice input processed by the speech signal processor. The speech event analyzer may transmit the candidate sets to a dictation event subsystem. The dictation event subsystem may analyze the candidate sets and choose the best match candidate with the highest degree of similarity. This candidate is then considered the correct translation, and the dictation event subsystem forwards the translation to the text event subsystem which in turn inputs the translated text into the device.

While the device, system, and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A broadcast television support platform comprising: at least one processor being configured to provide support to a wireless device implementing a television receiver configured to implement ATSC 3.0 (Advanced Television Systems Committee 3.0) standards and further configured for receiving and displaying terrestrial television content; an input/output device, the input/output device configured to connect the broadcast television support platform over a wireless network to the wireless device implementing the television receiver to support reception and display of the terrestrial television content; and the at least one processor being configured, in real-time, to enforce policies based upon (i) a plurality of different rules of a subscription between the wireless device and broadcast television support platform and (ii) a subscriber status on the wireless device implementing the television receiver to support reception and display of the terrestrial television content, wherein: the at least one processor being configured to manage the television receiver, channel access and display for the wireless device implementing the television receiver to support reception and display of the terrestrial television content; and the television receiver comprises a Software-Defined Radio (SDR) chip.

2. The broadcast television support platform of claim 1 wherein:
the television receiver comprises an Advanced Television Systems Committee 3.0 (ATSC 3.0) compliant receiver;
the at least one processor being configured to implement subscription management features to the wireless device implementing the television receiver to support reception and display of the terrestrial television content; and
the subscription management features provided by the at least one processor include at least one of the following: information provided by the at least one processor, features provided by the at least one processor, and data provided by the at least one processor.

3. The broadcast television support platform of claim 1 wherein:
the at least one processor being configured to provide access to programming information to the wireless device implementing the television receiver to support reception and display of the terrestrial television content; and
the programming information includes at least one of the following: electronic program guides (EPGs) and interactive program guides (IPGs) that include menu-based systems that provide users with continuously updated menus displaying broadcast programming.

4. The broadcast television support platform of claim 1 wherein the at least one processor being configured to at least one of the following: add policies based upon subscription rules and subscriber status, delete policies based upon subscription rules and subscriber status, modify policies based upon subscription rules and subscriber status.

5. The broadcast television support platform of claim 1 wherein:
the television receiver comprises an Advanced Television Systems Committee 3.0 (ATSC 3.0) compliant receiver;
the at least one processor being configured to provide television scheduling to the wireless device implementing the television receiver to support reception and display of the terrestrial television content; and
the television scheduling includes at least one of the following: channels, television shows, sporting events, times, length of shows, cast, production crew, personnel biographies, plot summaries, trivia, fan reviews, and ratings.

6. The broadcast television support platform of claim 1 wherein the at least one processor being configured to provide television guide information to the wireless device implementing the television receiver to support reception and display of the terrestrial television content.

7. The broadcast television support platform of claim 1 wherein:
   the at least one processor being configured to provide digital video recorder (DVR) functionality to the wireless device implementing the television receiver to support reception and display of the terrestrial television content; and
   wherein the digital video recorder (DVR) functionality includes play back, record, pause, fast-forward, and rewind functionality of television programming stored in a memory of the wireless device.

8. The broadcast television support platform of claim 1 wherein:
   the at least one processor being configured to implement subscription management features to the wireless device implementing the television receiver to support reception and display of the terrestrial television content;
   the at least one processor being configured to provide access to programming information to the wireless device implementing the television receiver to support reception and display of the terrestrial television content;
   the programming information includes at least one of the following: electronic program guides (EPGs) and interactive program guides (IPGs) that include menu-based systems that provide users with continuously updated menus displaying broadcast programming;
   the at least one processor being configured to at least one of the following: add policies based upon subscription rules and subscriber status, delete policies based upon subscription rules and subscriber status, modify policies based upon subscription rules and subscriber status;
   the at least one processor being configured to manage the television receiver, channel access and display for the wireless device implementing the television receiver to support reception and display of the terrestrial television content;
   the at least one processor being configured to provide digital video recorder (DVR) functionality to the wireless device implementing the television receiver to support reception and display of the terrestrial television content; and
   the digital video recorder (DVR) functionality includes play back, record, pause, fast-forward, and rewind functionality of television programming stored in a memory of the wireless device.

9. A system comprising the broadcast television support platform of claim 1 and the wireless device, the wireless device comprising:
   a transceiver configured to transmit data and receive data via a wireless network;
   a processor configured to control the transceiver and execute an application;
   the application configured to connect utilizing the transceiver to the broadcast television support platform via the wireless network;
   the television receiver;
   the application is further configured to implement and control the television receiver;
   a display to display video associated with received television signals; and
   a computer readable medium configured to store the application.

10. A broadcast television support process comprising:
    implementing at least one processor in a broadcast television support platform to provide support to a wireless device implementing a television receiver configured to implement ATSC 3.0 (Advanced Television Systems Committee 3.0) standards and further configured for receiving and displaying terrestrial television content; connecting, with an input/output device of the at least one processor over a wireless network, to the wireless device implementing the television receiver to support reception and display of the terrestrial television content; and enforcing, with the at least one processor in real-time, policies based upon (i) a plurality of different rules of a subscription between the wireless device and broadcast television support platform and (ii) a subscriber status, on the wireless device implementing the television receiver to support reception and display of the terrestrial television content, wherein: the at least one processor being configured to manage the television receiver, channel access and display for the wireless device implementing the television receiver to support reception and display of the terrestrial television content; and the television receiver comprises a Software-Defined Radio (SOR) chip.

11. The broadcast television support process of claim 10 wherein:
    the television receiver comprises an Advanced Television Systems Committee 3.0 (ATSC 3.0) compliant receiver;
    the at least one processor being configured to implement subscription management features to the wireless device implementing the television receiver to support reception and display of the terrestrial television content; and
    the subscription management features provided by the at least one processor include at least one of the following: information provided by the at least one processor, features provided by the at least one processor, and data provided by the at least one processor.

12. The broadcast television support process of claim 10 wherein:
    the at least one processor being configured to provide access to programming information to the wireless device implementing the television receiver to support reception and display of the terrestrial television content; and
    the programming information includes at least one of the following: electronic program guides (EPGs) and interactive program guides (IPGs) that include menu-based systems that provide users with continuously updated menus displaying broadcast programming.

13. The broadcast television support process of claim 10 wherein the at least one processor being configured to at least one of the following: add policies based upon subscription rules and subscriber status, delete policies based upon subscription rules and subscriber status, modify policies based upon subscription rules and subscriber status.

14. The broadcast television support process of claim 10 wherein:
    the television receiver comprises an Advanced Television Systems Committee 3.0 (ATSC 3.0) compliant receiver;

the at least one processor being configured to provide television scheduling to the wireless device implementing the television receiver to support reception and display of the terrestrial television content; and the television scheduling includes at least one of the following: channels, television shows, sporting events, times, length of shows, cast, production crew, personnel biographies, plot summaries, trivia, fan reviews, and ratings.

15. The broadcast television support process of claim 10 wherein the at least one processor being configured to provide television guide information to the wireless device implementing the television receiver to support reception and display of the terrestrial television content.

16. The broadcast television support process of claim 10 wherein:

the at least one processor being configured to provide digital video recorder (DVR) functionality to the wireless device implementing the television receiver to support reception and display of the terrestrial television content; and wherein the digital video recorder (DVR) functionality includes play back, record, pause, fast-forward, and rewind functionality of television programming stored in a memory of the wireless device.

17. The broadcast television support process of claim 10 wherein:

the at least one processor being configured to implement subscription management features to the wireless device implementing the television receiver to support reception and display of the terrestrial television content;

the at least one processor being configured to provide access to programming information to the wireless device implementing the television receiver to support reception and display of the terrestrial television content;

the programming information includes at least one of the following: electronic program guides (EPGs) and interactive program guides (IPGs) that include menu-based systems that provide users with continuously updated menus displaying broadcast programming;

the at least one processor being configured to at least one of the following: add policies based upon subscription rules and subscriber status, delete policies based upon subscription rules and subscriber status, modify policies based upon subscription rules and subscriber status;

the at least one processor being configured to manage the television receiver, channel access and display for the wireless device implementing the television receiver to support reception and display of the terrestrial television content;

the at least one processor being configured to provide digital video recorder (DVR) functionality to the wireless device implementing the television receiver to support reception and display of the terrestrial television content; and the digital video recorder (DVR) functionality includes play back, record, pause, fast-forward, and rewind functionality of television programming stored in a memory of the wireless device.

18. The broadcast television support process of claim 10 further comprising implementing the wireless device, the wireless device comprising:

a transceiver configured to transmit data and receive data via a wireless network;

a processor configured to control the transceiver and execute an application;

the application configured to connect utilizing the transceiver to the broadcast television support platform via the wireless network;

the television receiver;

the application is further configured to implement and control the television receiver;

a display to display video associated with received television signals; and a computer readable medium configured to store the application.

* * * * *